US011537476B2

(12) United States Patent
Brunzema et al.

(10) Patent No.: US 11,537,476 B2
(45) Date of Patent: Dec. 27, 2022

(54) DATABASE MANAGEMENT SYSTEM BACKUP AND RECOVERY MANAGEMENT

(71) Applicant: SAP SE, Walldorf (DE)

(72) Inventors: Martin Brunzema, Berlin (DE); Anne Roessiger, Berlin (IN); Henrik Hempelmann, Havelberg (DE); Benedikt Klus, Hamburg (DE); Stefan Voss, Potsdam (DE); Daniel Kirmse, Berlin (DE)

(73) Assignee: SAP SE, Walldorf (DE)

( * ) Notice: Subject to any disclaimer, the term of this patent is extended or adjusted under 35 U.S.C. 154(b) by 387 days.

(21) Appl. No.: 16/829,531

(22) Filed: Mar. 25, 2020

(65) Prior Publication Data
US 2021/0303415 A1  Sep. 30, 2021

(51) Int. Cl.
*G06F 11/14* (2006.01)
*G06F 16/23* (2019.01)

(52) U.S. Cl.
CPC ...... *G06F 11/1469* (2013.01); *G06F 11/1438* (2013.01); *G06F 11/1448* (2013.01); *G06F 16/2365* (2019.01); *G06F 2201/80* (2013.01)

(58) Field of Classification Search
CPC .. G06F 11/14; G06F 11/1469; G06F 11/1438; G06F 11/1448
See application file for complete search history.

(56) References Cited

U.S. PATENT DOCUMENTS

| | | | | |
|---|---|---|---|---|
| 6,347,322 | B1* | 2/2002 | Bogantz | G06F 16/27 |
| 9,501,365 | B2* | 11/2016 | Parab | G06F 11/1464 |
| 10,747,625 | B2* | 8/2020 | Gaschler | G06F 16/27 |
| 11,102,251 | B1* | 8/2021 | Pettit | H04L 63/205 |
| 11,120,047 | B1* | 9/2021 | Hoffmann | G06F 16/273 |
| 11,334,422 | B2* | 5/2022 | Cai | G06F 16/27 |
| 2005/0262377 | A1* | 11/2005 | Sim-Tang | G06F 11/2069 |
| | | | | 714/1 |
| 2006/0200500 | A1* | 9/2006 | Baek | G06F 11/1474 |
| 2007/0168058 | A1* | 7/2007 | Kephart | G06F 11/2028 |
| | | | | 714/E11.08 |
| 2010/0153945 | A1* | 6/2010 | Bansal | G06F 9/4881 |
| | | | | 718/1 |
| 2010/0293147 | A1* | 11/2010 | Snow | G06F 16/10 |
| | | | | 707/E17.007 |

(Continued)

*Primary Examiner* — Kamini B Patel
(74) *Attorney, Agent, or Firm* — Buckley, Maschoff & Talwalkar LLC (57) ABSTRACT

According to some embodiments, a system to manage database management system backups may include a plurality of database services. For each database service, a database backup resource (e.g., a human-readable structured document) may specify desired backup state information (e.g., a buffer size, a schedule, an amount of memory, etc.). A stateless backup operator component may then compare a present backup state of each database service with the associated desired backup state information. When a mismatch is identified between the present backup state of a database service and the associated desired backup state information, that database service may be automatically reconfigured (e.g., in connection with a recover job, backup job, backup configuration job, keystore backup job, etc.) in accordance with the desired backup state information.

16 Claims, 10 Drawing Sheets

(56) References Cited

U.S. PATENT DOCUMENTS

| | | | |
|---|---|---|---|
| 2011/0082832 A1* | 4/2011 | Vadali | G06F 11/1451 |
| | | | 711/E12.001 |
| 2012/0124306 A1* | 5/2012 | Abercrombie | G06F 11/1451 |
| | | | 711/E12.103 |
| 2013/0110766 A1* | 5/2013 | Promhouse | G06F 16/2365 |
| | | | 707/607 |
| 2013/0166521 A1* | 6/2013 | Ghatty | G06F 11/1469 |
| | | | 707/E17.005 |
| 2015/0269032 A1* | 9/2015 | Muthyala | G06F 3/065 |
| | | | 707/649 |
| 2016/0232061 A1* | 8/2016 | Gaschler | G06F 11/1461 |
| 2017/0295223 A1* | 10/2017 | Prasad | H04L 67/1012 |
| 2018/0121296 A1* | 5/2018 | Gaschler | G06F 11/1461 |
| 2019/0278854 A1* | 9/2019 | Newman | G06F 16/22 |
| 2020/0073980 A1* | 3/2020 | Lundberg | G06F 16/2379 |
| 2020/0192716 A1* | 6/2020 | Durvasula | G06F 9/4812 |
| 2020/0204492 A1* | 6/2020 | Sarva | H04L 67/34 |
| 2020/0394110 A1* | 12/2020 | Ramohalli Gopala Rao | |
| | | | G06F 11/2066 |
| 2021/0303412 A1* | 9/2021 | Hempelmann | G06F 16/1734 |
| 2021/0385254 A1* | 12/2021 | Pettit | H04L 63/205 |
| 2022/0012216 A1* | 1/2022 | Tidrow | G06F 11/0709 |

* cited by examiner

DATABASE MANAGEMENT SYSTEM BACKUP AND RECOVERY MANAGEMENT

BACKGROUND

An enterprise may use a Database Management System ("DBMS") to handle a substantial number of database transactions. This may be the case, for example, when a database management system is used by software companies, financial services businesses, e-commerce websites, Human Resource ("HR") departments, etc. Moreover, a DBMS such as a Relational DBMS ("RDBMS") and/or Database as a Service ("DBaaS") may periodically store backup information. In this way, if something goes wrong with the database information can be restored or recovered to a prior known state. Note that backup operations are usually set up once, during the creation of a database service.

There are disadvantages, however, to this typical approach. For example, an error that occurs during operation of the database is typically detected using sophisticated monitoring concepts. Once detected, the error is fixed manually. Often, the type of error is associated with a system misconfiguration (e.g., an incorrect buffer size or amount of memory). These types of errors, however, can be difficult to determine by monitoring. As a result, managing backup operations can be an expensive and error prone part of operating database systems. Moreover, when deploying and operating a large number of database services, this approach can become unmanageable. It may therefore be desirable to manage DBMS backups and recoveries in a secure, automatic, and accurate manner.

SUMMARY

According to some embodiments, a system to manage DBMS backups may include a plurality of database services. For each database service, a database backup resource (e.g., a human-readable structured document) may specify desired backup state information (e.g., a buffer size, a schedule, an amount of memory, etc.). A stateless backup operator component may then compare a present backup state of each database service with the associated desired backup state information. When a mismatch is identified between the present backup state of a database service and the associated desired backup state information, that database service may be automatically reconfigured (e.g., in connection with a recover job, backup job, backup configuration job, keystore backup job, etc.) in accordance with the desired backup state information.

Some embodiments comprise: for each of a plurality of database services, means for specifying a database backup resource indicating desired backup state information; means for comparing, by a stateless backup operator component, a present backup state of each database service with the associated desired backup state information; and when a mismatch is identified between the present backup state of a database service and the associated desired backup state information, means for automatically reconfiguring that database service in accordance with the desired backup state information.

Some technical advantages of some embodiments disclosed herein are improved systems and methods to manage DBMS backups and recoveries in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
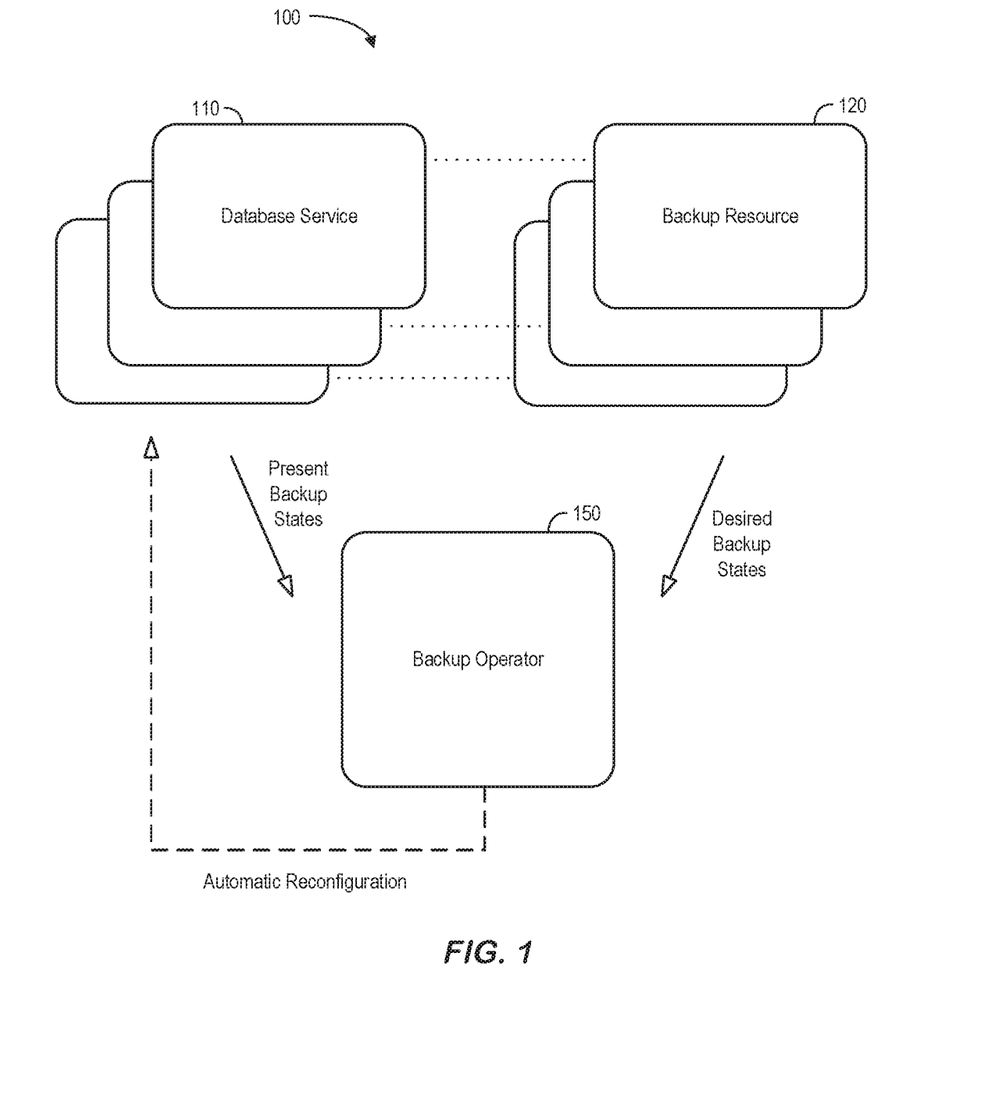
FIG. 1 is a block diagram of a system to manage DBMS backups and recoveries according to some embodiments.

Provided herein are system, method and/or computer program product embodiments, and/or combinations and sub-combinations thereof, to manage DBMS backups and recoveries in a secure, automatic, and accurate manner. For example, FIG. 1 is a block diagram of a system 100 to manage DBMS backups and recoveries according to some embodiments. The system 100 includes a plurality of database services 110 and, for each database service, a database backup resource 120 that specifies desired backup state information (e.g., configuration information associated with backup and/or recovery operations). According to some embodiments, the plurality of databases in the system 100 is associated with a hyper-scalar environment.

A stateless backup operator component 150 may compare a present backup state of each database service 110 with the associated desired backup state information (e.g., as read from the backup resource 120). When a mismatch is identified between the present backup state of a database service 110 and the associated desired backup state information, that database service 110 is automatically reconfigured by the stateless backup operator component 150 in accordance with the desired backup state information (as illustrated by the dashed line in FIG. 1).

Figure 2:
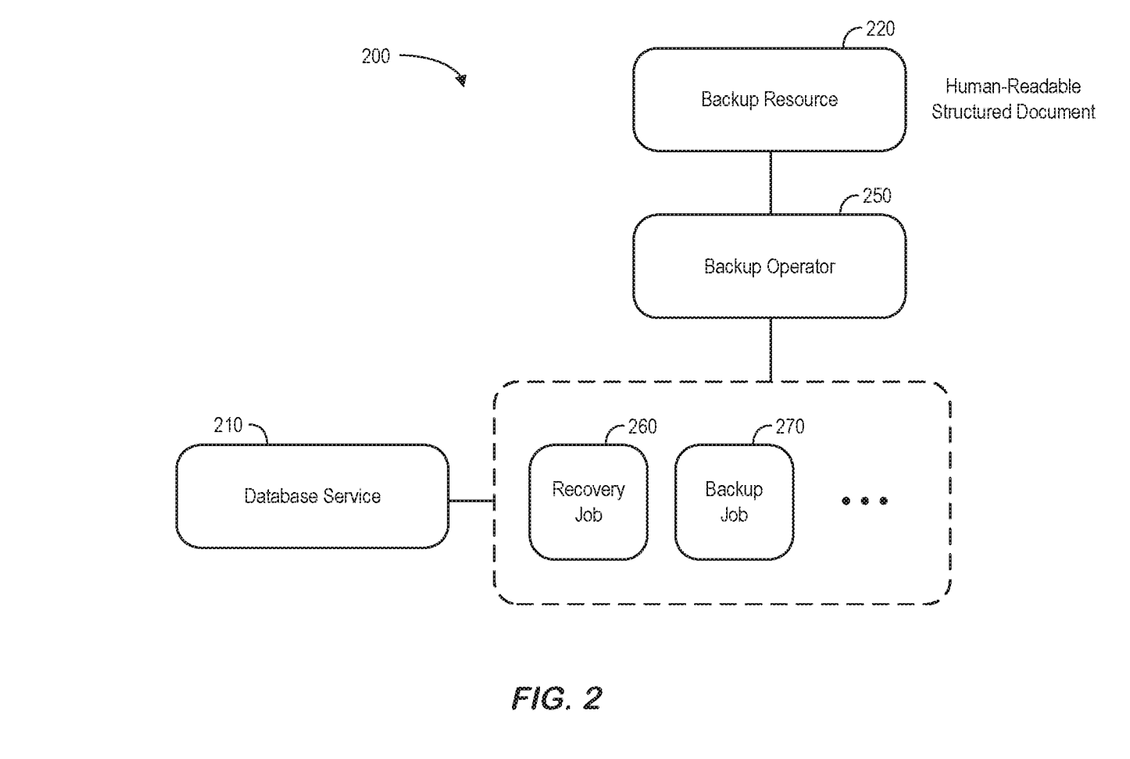
FIG. 2 is a high-level block diagram of a system architecture associated with a DBMS in accordance with some embodiments.

FIG. 2 is a high-level block diagram of a system 200 (e.g., a hyper-scalar environment) architecture associated with a DBMS in accordance with some embodiments. As before, the system 200 includes a plurality of database services 210 and, for each database service, a database backup resource 220 that specifies desired backup state information (e.g., configuration information associated with backup and/or recovery operations). According to some embodiments, the backup resource 220 comprises a human-readable structured document. This might, for example, let an operator or administrator quickly review a set of requirements to look for potential problems.

A backup operator 250 may compare a present backup state of each database service 210 with the associated desired backup state information (e.g., as read from the backup resource 220). When a mismatch is identified between the present backup state of a database service 210 and the associated desired backup state information, that database service 210 is automatically reconfigured by the backup operator 250 in accordance with the desired backup state information. In particular, the backup operator 250 may arrange to execute a recovery job 260, a backup job 270, etc.

Figure 3:
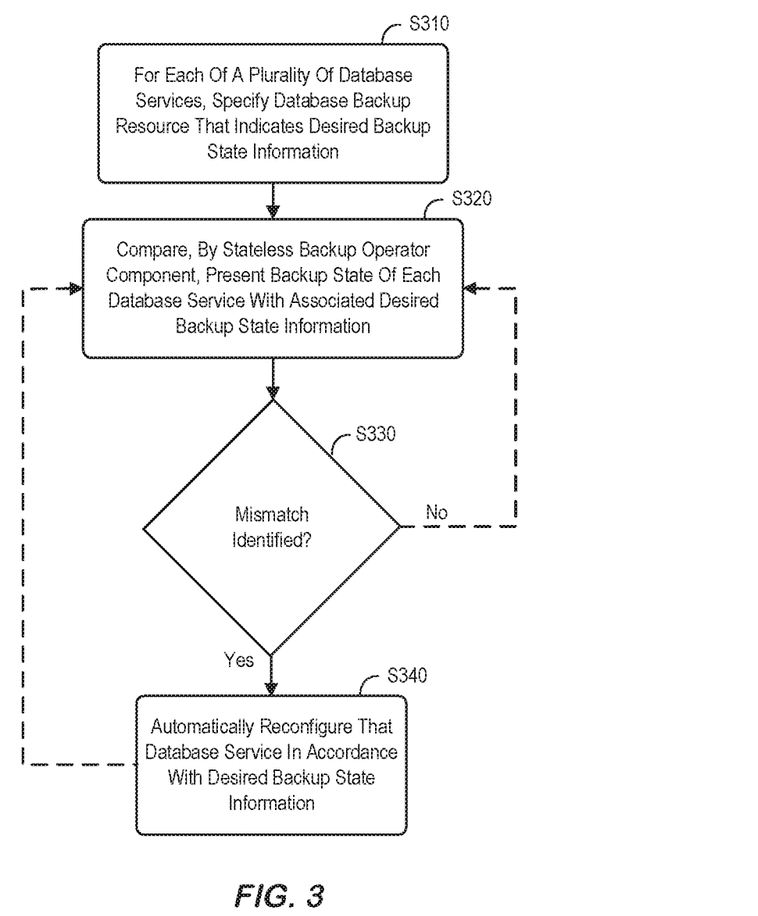
FIG. 3 is a DBMS backup and recovery management method according to some embodiments.

FIG. 3 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

For each of a plurality of database services, at S310 the system may specify a database backup resource indicating desired backup state information. Examples of desired backup state information might include data associated with a buffer size, a default size, a schedule (e.g., a time of day or day of week), an amount of memory, database key information, etc. According to some embodiments, the desired backup state information is associated with a Recovery Point Objective ("RPO") of a database Service Level Agreement ("SLA"). As used herein the phrase "RPO" might refer to a maximum targeted period in which data (e.g., transactions) might be lost from an Information Technology ("IT") service due to a disaster or other major incident. Similarly, the desired backup state information could be associated with a Recovery Time Objective ("RTO") of a database SLA. As used herein the phrase "RTO" might refer to a targeted duration of time and a service level within which a business process must be restored after a problem is detected.

At S320, a stateless backup operator component may compare a present backup state of each database service with the associated desired backup state information. According to some embodiments, the stateless backup operator component periodically performs said comparison in regular intervals (e.g., every five minutes or once per day). Note that the stateless backup operator component could be scaled up responsive to a load increase.

When no mismatch is identified between the present backup state of a database service and the associated desired backup state information at S330, the process may continue at S320 (as illustrated by the dashed arrow in FIG. 3). When a mismatch is identified between the present backup state of a database service and the associated desired backup state information at S330, the system may automatically reconfigure that database service in accordance with the desired backup state information at S340 and the process may continue at S320 (as illustrated by the dashed arrow in FIG. 3). Note that the stateless backup operator component could be restarted responsive to a failure without impacting the availability of an associated database service.

Figure 4:
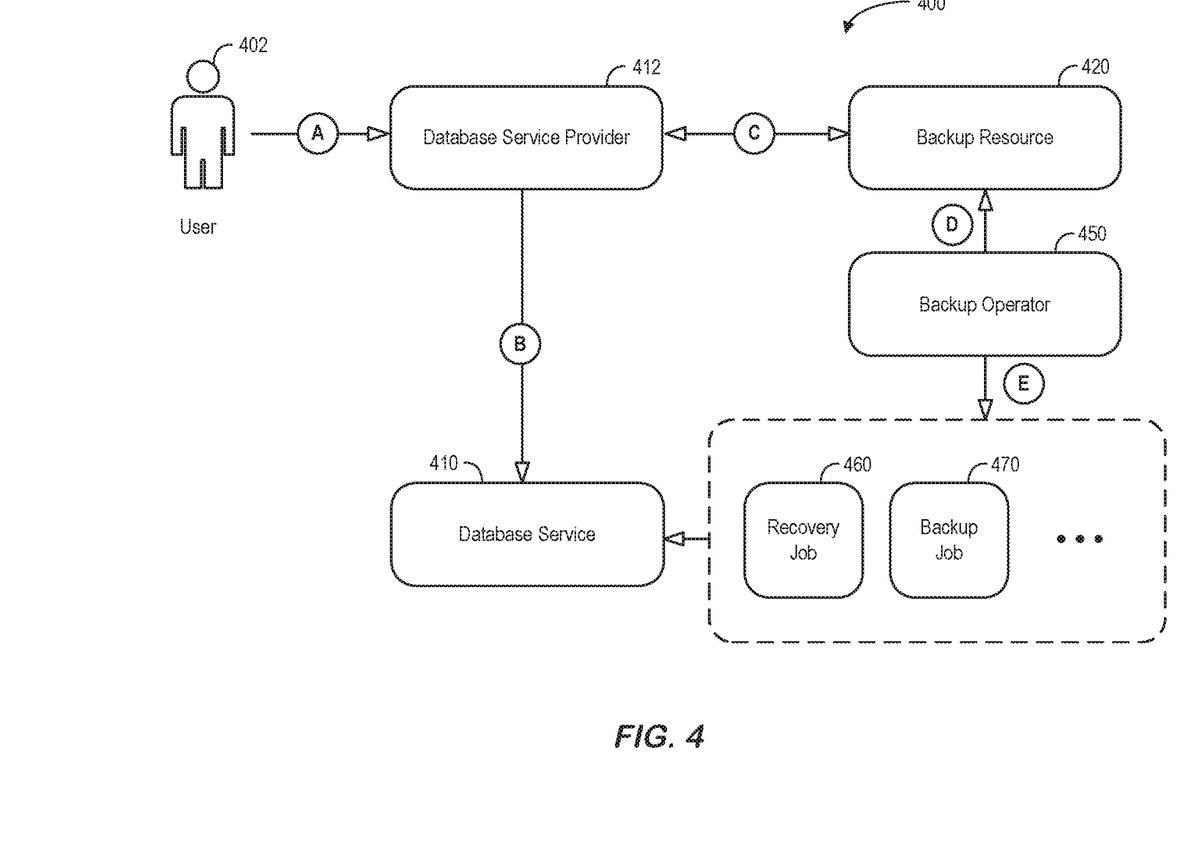
FIG. 4 is a more detailed system architecture associated with a DBMS in accordance with some embodiments.

FIG. 4 is a more detailed system 400 architecture associated with a DBMS in accordance with some embodiments. At (A), a user 402 may request a database service 410. At (B) a database services provider 412 may create at least one database service 410 and at least one associated backup resource 420 in response to the request received from the user 402 at (C). As before, the database backup resource 420 may specify desired backup state information (e.g., configuration information associated with backup and/or recovery operations).

A backup operator 450 may compare a present backup state of each database service 410 with the associated desired backup state information (e.g., as read from the backup resource 420 at (D)). When a mismatch is identified between the present backup state of a database service 410 and the associated desired backup state information, that database service 410 is automatically reconfigured by the backup operator 450 at (E) in accordance with the desired backup state information. In particular, the backup operator 450 may arrange to execute a recovery job 460, a backup job 470, etc.

Figure 5:
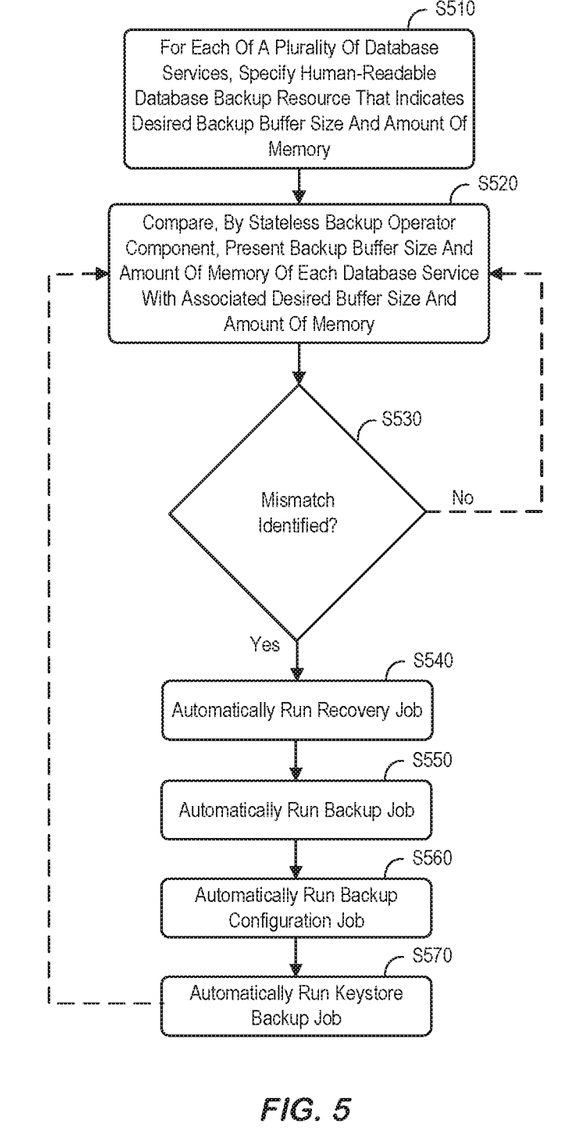
FIG. 5 is a more detailed DBMS backup and recovery method according to some embodiments.

FIG. 5 is a more detailed DBMS backup and recovery method according to some embodiments. For each of a plurality of database services, at S510 the system may specify a human-readable database backup resource indicating a desired buffer size and amount of memory. At S520, a stateless backup operator component may compare a present backup state of each database service with the associated desired buffer size and amount of memory. When no mismatch is identified between the present backup state of a database service and the associated desired buffer size and amount of memory at S530, the process may continue at S520 (as illustrated by the dashed arrow in FIG. 3). When a mismatch is identified between the present backup state of a database service and the associated desired buffer size and amount of memory at S530, the system may automatically reconfigure that database service in accordance with the desired buffer size and amount of memory by automatically running a recovery job at S540, automatically running a backup job at S550, automatically running a backup configuration job at S560, and/or automatically running a keystore backup job at S570. The process may then continue at S520.

Figure 6:
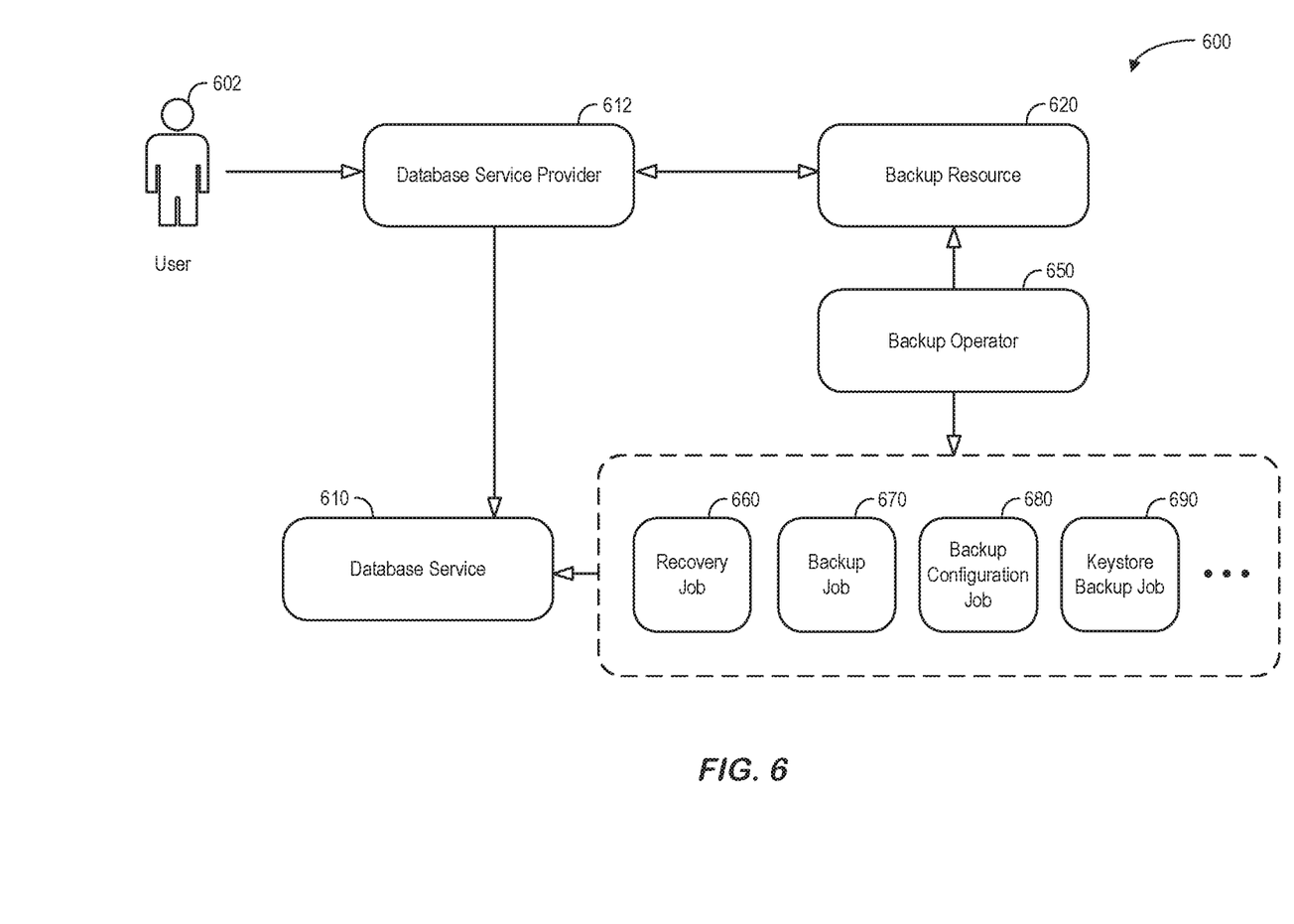
FIG. 6 illustrates another DBMS backup and recovery system associated with various embodiments.

FIG. 6 illustrates another DBMS backup and recovery system 600 associated with various embodiments. As before, a user 602 may request a database service 610. A database services provider 612 may then create at least one database service 610 and at least one associated backup resource 620 in response to the request received from the user 602. The database backup resource 620 may specify desired backup state information, such as configuration information associated with backup and/or recovery operations.

A backup operator 650 may compare a present backup state of each database service 610 with the associated desired backup state information. When a mismatch is identified between the present backup state of a database service 610 and the associated desired backup state information, that database service 610 is automatically reconfigured by the backup operator 650 in accordance with the desired backup state information. In particular, the backup operator 650 may arrange to execute a recovery job 660, a backup job 670, a backup configuration job, a keystore backup job (e.g., to provide database backup privacy and/or security), etc.

In this way, for each database a backup resource 620 may be created which specifies all backup related configurations. This backup resource 620 may describe the desired state for each database service 610 regarding backup and recovery operations. The present backup state of the database service 610 is then compared to the desired state maintained in the backup resource 620 in regular intervals. This comparison may be executed by a central component called the backup operator 650. In the case of a mismatch, the database service 610 can be automatically reconfigured to match the desired state.

The backup operator 650 is operating stateless and thus can be scaled up easily when load increases. Also, during any kind of failure the backup operator 650 can be easily restarted without harming the availability of the database services 610 (because there are no dependencies to the database service 610). By encapsulating the handling of the desired state (together with the operations needed to reach that state), the backup operator 650 may represent a single source of truth with respect to all system 600 backup and recovery operations. Some embodiments may help ensure that the database is always configured as desired. With respect to backup and recovery, this may help ensure that an SLA is met.

Figure 7:
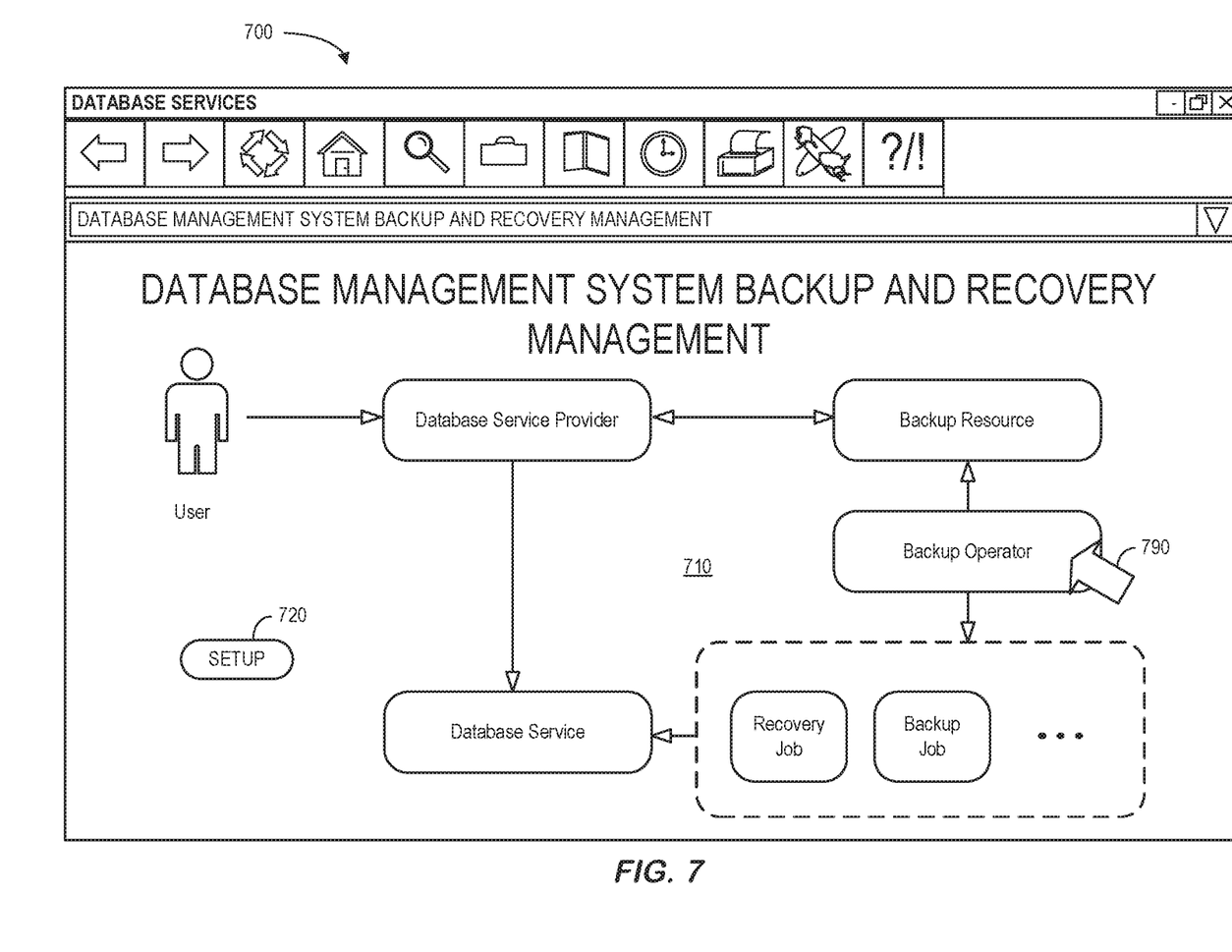
FIG. 7 is a DBMS backup and recovery management display in accordance with some embodiments.

FIG. 7 is a real-time database backup and recovery management display in accordance with some embodiments. The display 700 includes graphical elements 710 of a backup and recovery management system including database service, backup resources, and a backup operator. Selection of a graphical element (e.g., via a touchscreen or computer mouse pointer 790) may let an operator or administrator view additional information about that element (e.g., via a popup window) and/or adjust parameters associated with that element (e.g., backup mappings, customer SLA requirements, system status, housekeeping details, etc.). Moreover, selection of a "Setup" icon 720 may let a user configure the specific operation of the system.

Figure 8:
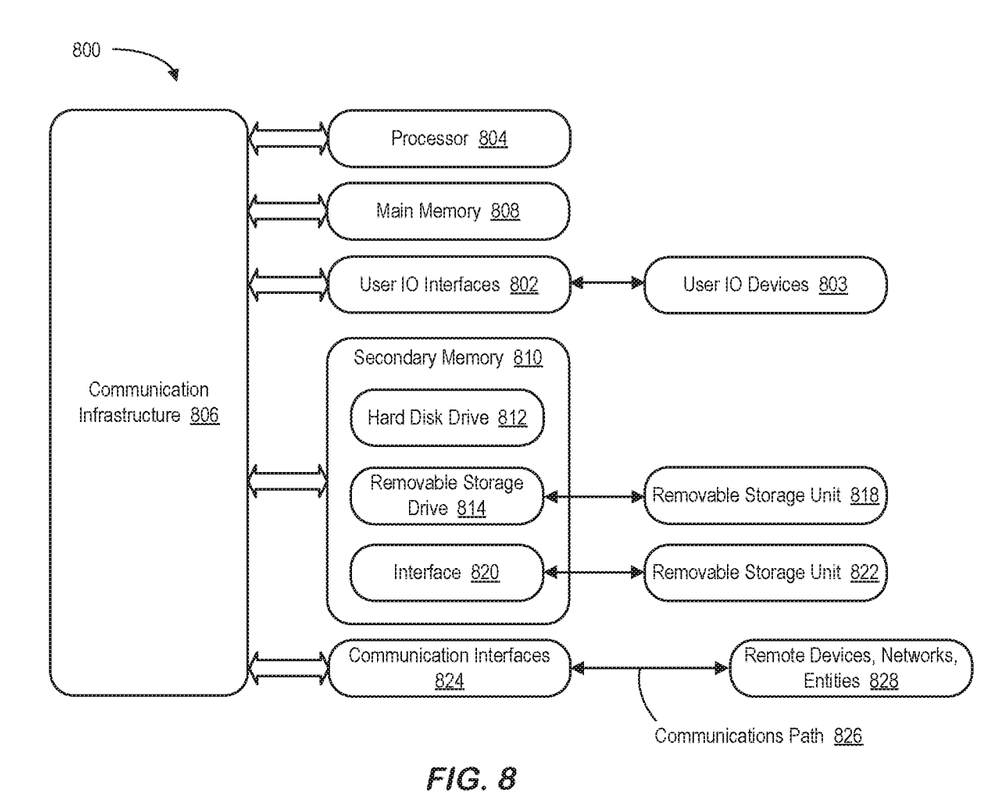
FIG. 8 is an example of a computer system useful for implementing various embodiments.

Various embodiments can be implemented, for example, using one or more well-known computer systems, such as computer system 800 shown in FIG. 8. The computer system 800 can be any well-known computer capable of performing the functions described herein. Computer system 800 includes one or more processors (also called CPUs), such as a processor 804. Processor 804 is connected to a communication infrastructure or bus 806.

One or more processors 804 may each be a Graphics Processing Unit ("GPU"). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure xx06 through user input/output interface(s) 802.

Computer system 800 also includes a main or primary memory 808, such as Random-Access Memory ("RAM"). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

Figure 9:
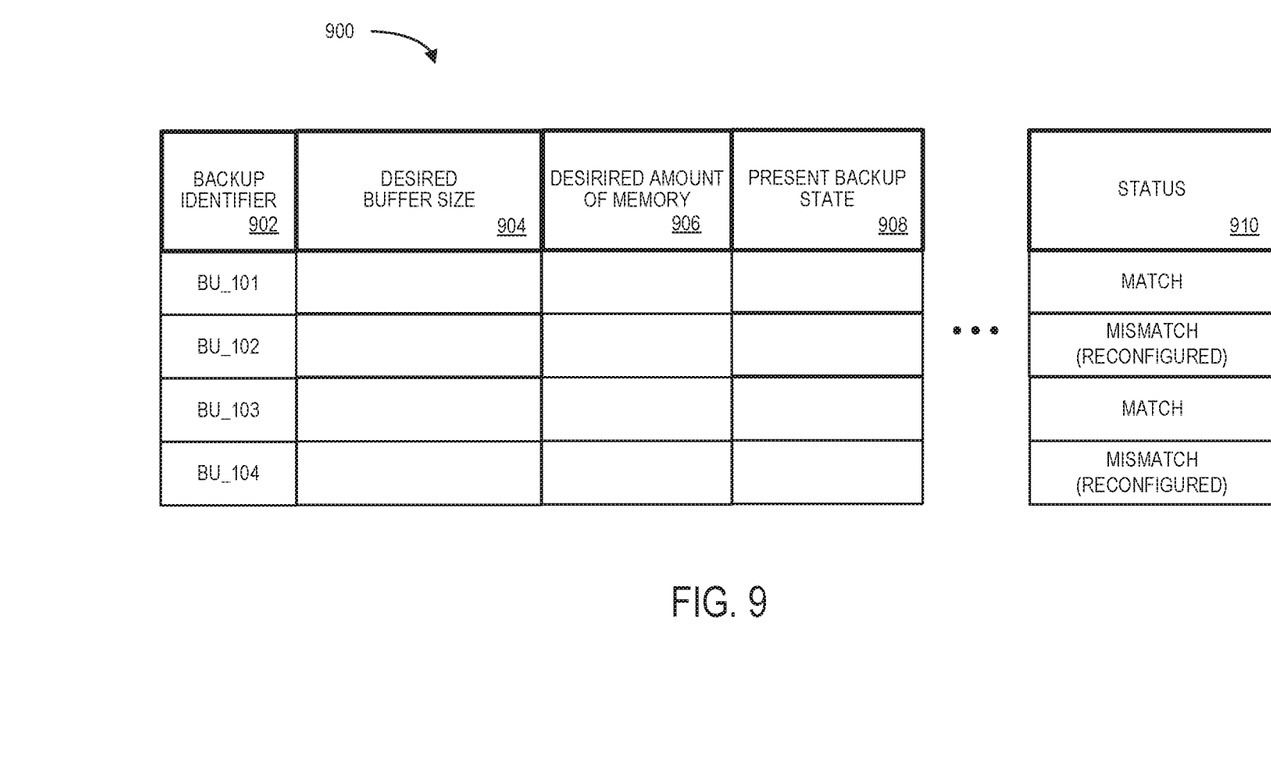
FIG. 9 is a portion of a tabular backup object database in accordance with some embodiments.

Referring to FIG. 9, a table is shown that represents a backup object database 900 in accordance with some embodiments. The table may include, for example, entries associated with database backup and recovery management. The table may also define fields 902, 904, 906, 908, 910 for each of the entries. The fields 902, 904, 906, 908, 910 may, according to some embodiments, specify: a backup identifier 902, a desired buffer size 904, a desired amount of memory 906, a present backup state 908, and a status 910. The backup object database 900 may be created and updated, for example, based on information electrically received from various operators, administrators, and computer systems (e.g., including those associated with backup and recovery management).

The backup identifier 902 may be, for example, a unique alphanumeric code identifying a single backup object. The desired buffer size 904 and desired amount of memory 906 may represent configuration parameters appropriate for the backup. The present backup state 908 may represent a measured or observed current value of those configuration parameters and the status 910 may indicate the result of such a comparison (e.g., match or mismatch) along with any remedial action that has been taken (e.g., a reconfiguration to meet the desired buffer size 904 and desired amount of memory 906).

Figure 10:
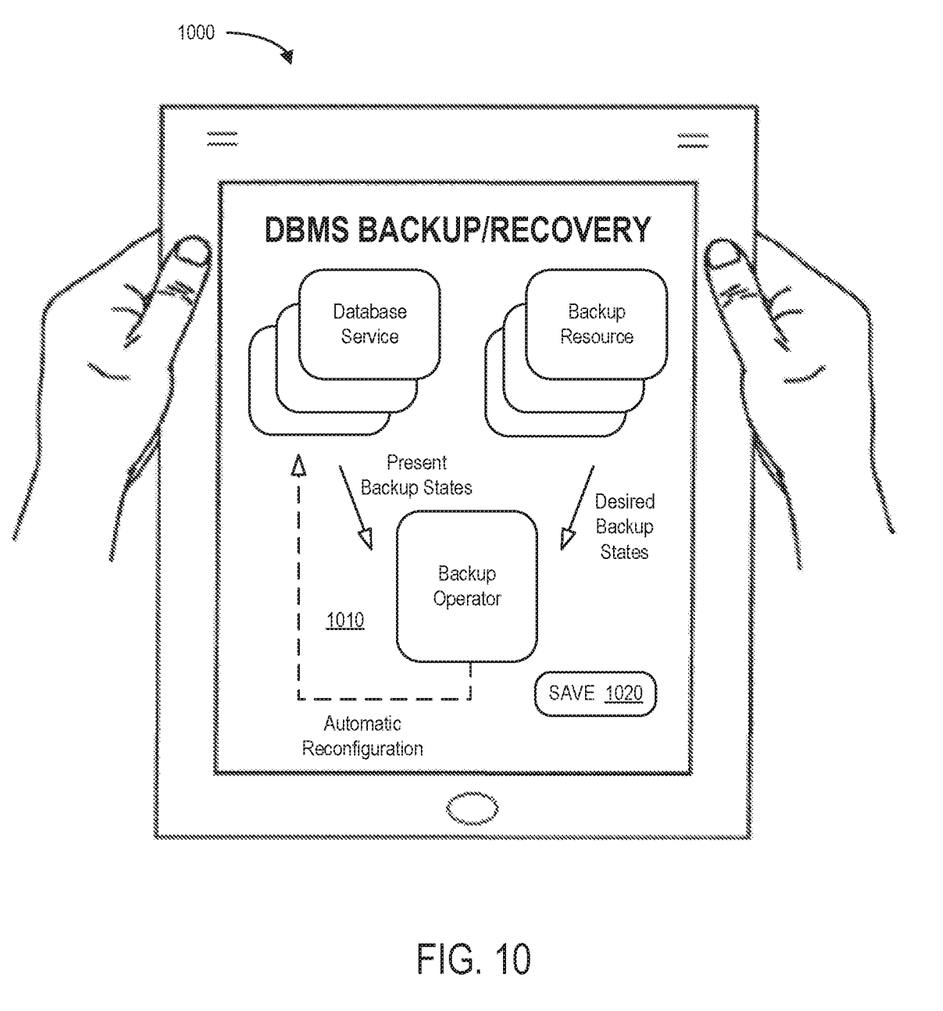
FIG. 10 illustrates a handheld tablet computer with a DBMS backup and recovery management display according to some embodiments.

The displays and devices illustrated herein are only provided as examples, and embodiments may be associated with any other types of user interfaces. For example, FIG. 10 illustrates a handheld tablet computer with a DBMS backup and recovery management display 1010 according to some embodiments. The DBMS backup and recovery management display 1010 might include user-selectable data that can be highlighted and/or modified by a user of the handheld computer 1000 to provide information about backup objects, desired configurations, current operation parameters, etc. Moreover, selection of a "Save" icon 1020 may store the values to be used by any of the embodiments described herein.

Thus, embodiments may manage database management system backups and recoveries in a secure, automatic, and accurate manner. Moreover, SLAs may be met automatically (e.g., in connection with RPO and RTO). According to some embodiments, operating costs may be reduced as a result of automation of operating tasks and the desired state can be explicitly documented in a human-readable format (e.g., in the backup resource). The backup operator may be, according to some embodiments, a design a resilient component of the system and thus increase system availability. In addition, monitoring of the database system is no longer needed with respect to backup and recovery operations in view or the automatic reconciling at regular intervals.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases and storage elements described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to manage database management system backups, comprising:
   a plurality of database services;
   for each database service, a database backup resource that specifies desired backup state information associated with a recovery point objective and recovery time objective of a database service level agreement, wherein the desired backup state information includes backup and recovery operations along with data associated with a keystore backup job that provides database backup privacy and security; and
   a stateless backup operator component, including:
      a computer processor, and
      a computer memory coupled to the computer processor and storing instructions that, when executed by the computer processor, cause the stateless backup operator component to compare a present backup state of each database service with the associated desired backup state information,
   wherein when a mismatch is identified between the present backup state of a database service and the associated desired backup state information, that database service is automatically reconfigured in accordance with the desired backup state information.

2. The system of claim 1, wherein the backup resource comprises a human-readable structured document.

3. The system of claim 1, wherein the desired backup state information includes configuration information.

4. The system of claim 1, wherein the desired backup state information includes database key information.

5. The system of claim 1, wherein the stateless backup operator component periodically performs said comparison in regular intervals.

6. The system of claim 1, wherein the stateless backup operator component is scaled up responsive to a load increase.

7. The system of claim 1, wherein the stateless backup operator component is restarted responsive to a failure without impacting an availability of an associated database service.

8. The system of claim 1, further comprising:
   a database services provider to create at least one database backup resource in response to a request received from a user.

9. The system of claim 1, wherein the plurality of databases is associated with a hyper-scalar environment.

10. A computer-implemented method to manage database management system backups, comprising:
   for each of a plurality of database services, specifying a database backup resource that indicates desired backup state information associated with a recovery point objective and recovery time objective of a database service level agreement, wherein the desired backup state information includes backup and recovery operations along with data associated with a keystore backup job that provides database backup privacy and security;

comparing, by a stateless backup operator component, a present backup state of each database service with the associated desired backup state information; and when a mismatch is identified between the present backup state of a database service and the associated desired backup state information, automatically reconfiguring that database service in accordance with the desired backup state information.

11. The method of claim 10, wherein the backup resource comprises a human-readable structured document.

12. The method of claim 10, wherein the desired backup state information includes database key information.

13. A non-transient, computer-readable medium storing instructions to be executed by a processor to perform a method to manage database management system backups, the method comprising:

for each of a plurality of database services, specifying a database backup resource indicating desired backup state information associated with a recovery point objective and recovery time objective of a database service level agreement, wherein the desired backup state information includes backup and recovery operations along with data associated with a keystore backup job that provides database backup privacy and security;

comparing, by a stateless backup operator component, a present backup state of each database service with the associated desired backup state information; and when a mismatch is identified between the present backup state of a database service and the associated desired backup state information, automatically reconfiguring that database service in accordance with the desired backup state information.

14. The medium of claim 13, wherein the stateless backup operator component periodically performs said comparison in regular intervals.

15. The medium of claim 13, wherein the stateless backup operator component is scaled up responsive to a load increase.

16. The medium of claim 13, wherein the stateless backup operator component is restarted responsive to a failure without impacting an availability of an associated database service.

* * * * *